April 9, 1957 H. E. KIMES 2,788,048
METALLIC INSERTS FOR TIRES
Filed April 29, 1954

Inventor:
Harold E. Kimes
By Gary, Desmond & Parker
Attys.

United States Patent Office 2,788,048
Patented Apr. 9, 1957

2,788,048

METALLIC INSERTS FOR TIRES

Harold E. Kimes, Freeport, Ill., assignor to Harold E. Kimes Corporation, Freeport, Ill., a corporation of Illinois Application April 29, 1954, Serial No. 426,382

2 Claims. (Cl. 152—211)

This invention relates to metallic inserts for tires and more particularly to generally U-shape inserts embedded within a tire tread to frictionally engage a road surface to prevent skidding and reduce punctures.

Heretofore, wire inserts of identical size and shape have been embedded within a tire to prevent skidding, the inserts being arranged in parallel rows to provide parallel rows of points engageable with a road surface. During starting or by applying the brakes of a vehicle, the parallel rows of points on the inserts serve to cut parallel grooves into a road surface, the number of grooves depending upon the number of rows of points on the tire tread. To provide better traction or frictional engagement with a road surface, it is an object of the present invention to provide a tire tread with rows of metallic inserts, the inserts in each row being of different widths with their ends in staggered relationship or nonparallel alignment. For example, each row of inserts may embody two or more different widths or sizes of inserts progressively arranged by size.

As set forth in my copending application Serial No. 171,813 and Patent No. 2,666,470 granted January 19, 1954, it is desirable to provide means to position metallic inserts within a tire mold prior to applying a tread onto a tire casing. It is, therefore, another object of the invention to provide a chain of interconnected U-shape inserts of different sizes whereby the smaller size inserts may be snapped into engagement with a retainer strip on the mold and/or the larger size inserts may have a width substantially equal to the spacing between channel forming ribs of a mold to locate and center the chain of inserts within the channel.

A further object of the invention resides in the provision of retainer strips formed from a length of relatively thin metal for mounting on the matrix of a tire mold to position a chain of inserts therein, the inserts having spaced resilient arcuate legs to straddle and snap onto the strip.

The invention embodies other novel features, details of construction and arrangement of parts which are hereinafter set forth in the specification and claims and illustrated in the accompanying drawings, wherein:

Figure 1:
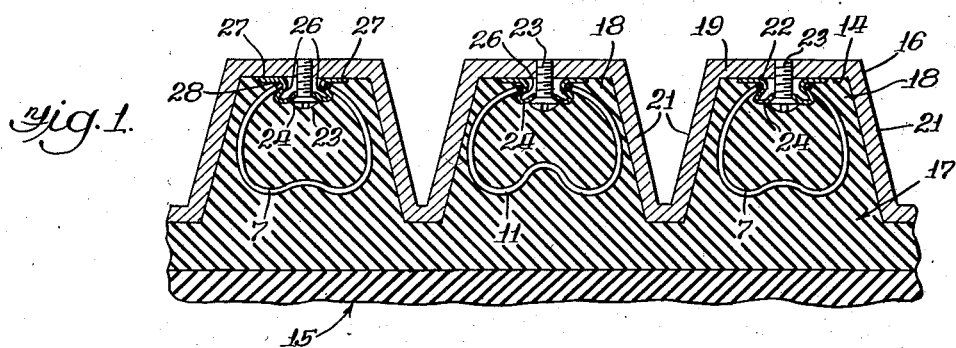
Fig. 1 is a fragmentary transverse sectional view illustrating chains of metallic inserts as mounted with annular recesses of a tire mold and embedded within the tread portion of a tire casing.

Referring now to the drawing for a better understanding of the invention, and more particularly to Figs. 1 to 4 therein, a chain of inserts 6 is shown as formed from a length of stiff resilient metallic wire to provide pairs of generally U-shape inserts 7—7 of identical size joined together at 8 and joined at 9 to relatively large inserts 11. The chain of inserts thus formed comprises alternate large inserts 11 and intermediate pairs of small inserts 7—7, and may be of suitable length for mounting within a tire mold as hereinafter described.

Figure 3:
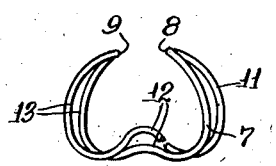
Fig. 3 is an end view of same.

The inserts 7 and 11 are generally U-shape and each comprises a curvilinear base 12 having a pair of arcuate arms 13—13 extending upwardly therefrom, as illustrated in Fig. 3. The metal at the junctures 8 and 9 of the chain of inserts is preferably weakened during manufacture, as by flattening or cutting part way through the wire, to facilitate separation of the inserts from each other during use within a tire. Each insert is also preferably disposed at an angle of from 10° to 35° from adjacent inserts.

Fig. 1 illustrates the manner in which chains of inserts 6 are adapted to be mounted within the annular rib forming recesses 14 of a conventional tire mold matrix 16 prior to vulcanization of a camel-back onto a tire casing 15 to form a tread portion 17 having annular, axially spaced ribs 18, each recess being defined by a circular outer wall 19 joining spaced annular side walls 21—21.

To secure the chains of inserts in fixed position within their respective recesses 14, a retainer ring 22 is provided within each recess and secured to the related outer wall 19 thereof by screws 23, the ring being centrally positioned between related side walls 21—21. As shown, described and claimed in my copending application, the arms 13—13 of each insert are adapted to straddle the retainer ring 22 and to frictionally engage opposite sides thereof to prevent accidental displacement of the chain of inserts from or relative to the mold matrix.

The retainer ring 22 may be inexpensively formed from a length of thin strip metal to provide a circular top wall 24 joining outwardly converging annular side walls 26—26 provided with circular flanges 27—27, the flanges and side walls defining circular recesses 28—28 to receive the ends of the insert arms 13—13. The top wall is formed with spaced apertures to receive the screws 23 for threaded engagement with the mold matrix. In this form of the invention, the retainer ring 22 may be inexpensively manufactured and readily mounted on conventional mold matrices. In the use of retainer rings on sectional molds in which the mold matrices comprise two or more sections arranged end to end to form a circular structure, the retainer ring is also formed in sections corresponding in length and secured to their related matrix sections.

Figure 2:
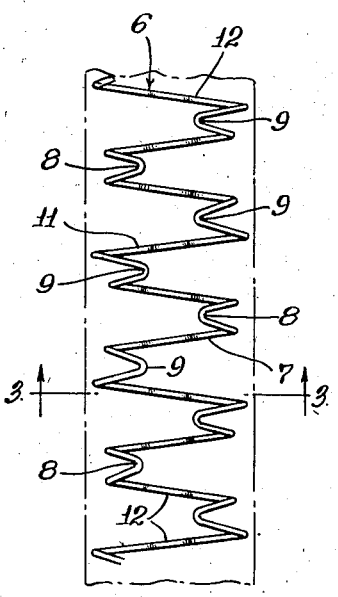
Fig. 2 is a top plan view illustrating the manner in which the metallic inserts may be formed, arranged and interconnected for mounting within a tire mold recess.

By forming and arranging the metallic inserts in a chain of inserts 6, as illustrated in Figs. 2 and 3, the retainer ring 22 may be omitted from one-piece circular mold matrices, shown in Patent 2,339,696, granted January 18, 1944, to Paul E. Hawkinson, as the chain of inserts is self-centering within its annular recess 14 by providing the larger inserts 11 with a width approximately equal to the width of the recess so that the arms of the inserts 11 contact adjacent side walls 21—21. It will, of course, be apparent that the large inserts 11 may, if desired, embody a different shape than herein shown and described and still have portions thereof engaging the side walls 21—21 to center the chain of inserts within a recess 14 without the use of a retainer ring or other form of centering means.

Figure 4:
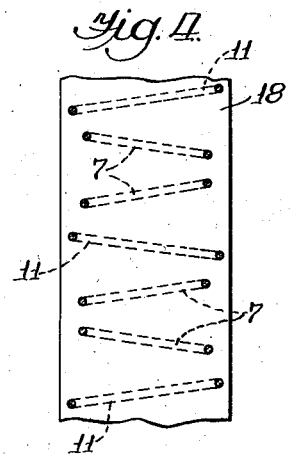
Fig. 4 is a fragmentary top plan view illustrating the manner in which a tire tread rib and the metallic inserts embedded therein are worn away to form individual inserts separated from each other and having their sharp ends protruding through the surface of the rib to engage a road surface.

The tread portion 17, with the chains of inserts 6 embedded therein, is vulcanized onto the tire casing 15 in a manner well known in this art; after which the tire is ready for use on a vehicle. During the first few miles of use of the tire, the metallic inserts become separated or detached from each other at their junctures 8 and 9 to present sharp points engageable with a road surface, as illustrated in Fig. 4, with the points in nonparallel staggered relationship to provide better traction.

Figure 5:
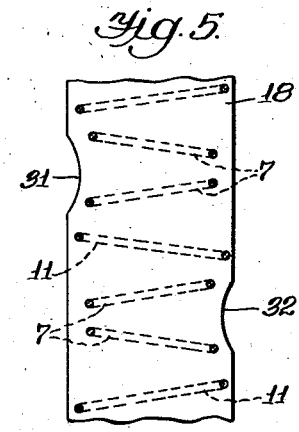
Fig. 5 is a top plan view corresponding to Fig. 4, showing a modified form of the invention in which recesses are formed in the side walls of the tire rib.

Fig. 5 illustrates a modified form of the invention in which the chains of inserts 6 are embedded within annular tread ribs 18a of a tire in the manner heretofore shown and described. In this form of the invention the matrix is formed to provide recesses 31 at circumferentially spaced intervals in the sides of ribs 18a between adjacent large inserts 11 to reduce skidding of the tire. This form of the invention is otherwise similar to the form heretofore described.

Figure 6:
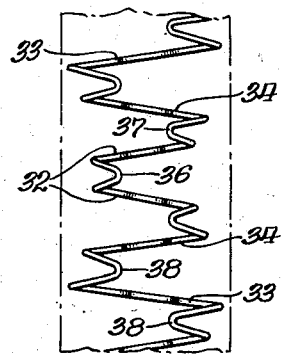
Fig. 6 is a top plan view, corresponding to Fig. 2, illustrating a modified form of the invention.
Figure 7:
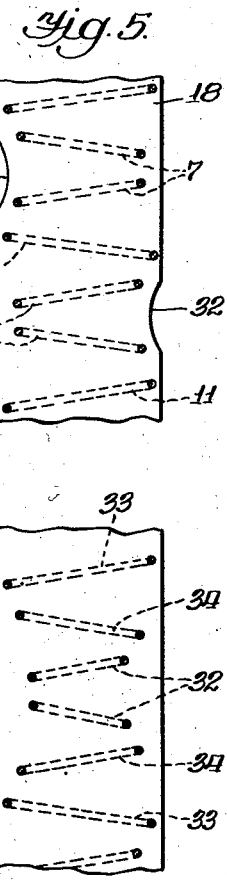
Fig. 7 is a fragmentary top plan view, corresponding to Fig. 4, illustrating the inserts of Fig. 6 embedded within a worn tire tread rib to provide sharp points at different spacings transversely of the rib.

Figs. 6 and 7 in the drawings illustrate another modified form of the invention in which the chain of inserts 6a is shown as comprising a length of stiff resilient wire bent to form a series of interconnected generally U-shape inserts of three different sizes and preferably having the shape of the inserts illustrated in Figs. 2 and 3, the smallest size inserts being indicated at 32, the largest inserts being indicated at 33 and the intermediate size inserts being indicated at 34.

Each insert is joined to adjacent inserts at the upper ends of the arms, in the manner shown and described in connection with Figs. 2 and 3 in the drawings. The small inserts 32 are joined together at 36 and also joined to adjacent intermediate inserts 34 at 37, and the intermediate inserts are joined at 38 to adjacent large inserts 33. In this form of the invention the junctures 36 and 37 only may be spaced to snap over and engage a retaining ring 22, while the largest inserts 33 may be formed having a width approximately equal to the width of a matrix recess 14 to engage the walls 21—21 thereof to center the chain of inserts. The tread rib 18b may be formed with recesses in its sides, if desired, as illustrated in Fig. 5.

After a tire embodying the chain of inserts 6a has traveled a few miles, the junctures 36, 37 and 38 become broken to disconnect the inserts from each other. Each insert then presents two sharp points on the tread periphery for engagement with a road surface, as illustrated in Fig. 7. Due to the difference in sizes of the inserts, the points of each insert are arranged in nonparallel, staggered relation to the points of adjacent inserts to provide better traction. This form of the invention is otherwise similar to the forms heretofore shown and described.

While the invention has been shown in several forms, it is obvious to those skilled in the art that it is not so limited, but is susceptible of various changes and modifications without departing from the spirit and scope of the claimed invention.

I claim:

1. In a pneumatic tire having an annular resilient tread, a circumferential metallic chain of inserts, each insert having a curvilinear base and a pair of arms projecting from the ends of said base, a portion of said base projecting re-entrantly between said arms, said re-entrant portion having a small radius of curvature relative to the radius of curvature of a section of the tire whereby wear of the arms and the subsequent wear of said re-entrant portion results in the division of each of said metallic inserts into two relatively small pieces of metal, said inserts being secured together at the ends of their arms in seriatim, adjacent inserts being of differing transverse extent and angularly disposed relative to each other, the spacing of the said relatively small pieces of metal thereby differing in transverse extent in alternate circumferential rows.

2. The construction of claim 1 wherein the successive arms of each insert are composed of two small sized inserts, each small insert being joined to a larger insert, and each larger sized insert being joined to a still larger sized insert.

References Cited in the file of this patent

UNITED STATES PATENTS

| 1,003,576 | Acker | Sept. 19, 1911 |
| 1,299,037 | Runyan | Apr. 1, 1919 |
| 2,084,784 | Stahl | June 22, 1937 |
| 2,600,506 | Kimes | June 17, 1952 |

FOREIGN PATENTS

| 641,766 | Great Britain | Aug. 16, 1950 |